T. D. CRANE.
SICKLE HEAD FOR MOWING MACHINES.
APPLICATION FILED FEB. 26, 1916.
1,257,191. Patented Feb. 19, 1918.
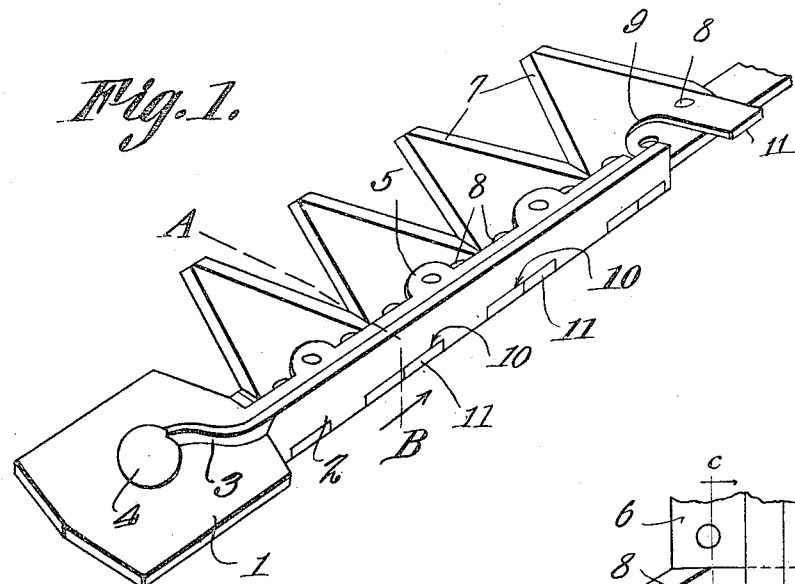
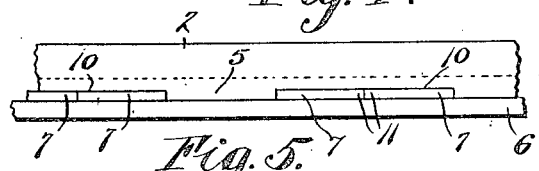
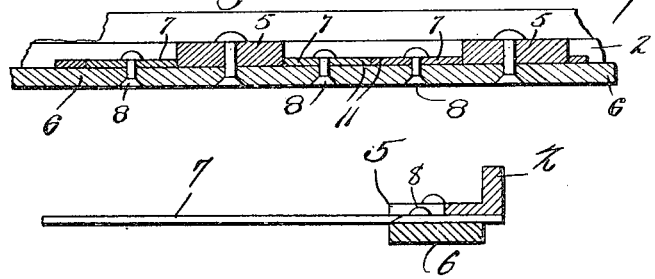
T. D. Crane
Inventor,
by C. A. Snow & Co.
Attorneys.

UNITED STATES PATENT OFFICE.

THEODORE D. CRANE, OF LITTLE SIOUX, IOWA.

SICKLE-HEAD FOR MOWING-MACHINES.

1,257,191.  Specification of Letters Patent.  Patented Feb. 19, 1918.

Application filed February 26, 1916. Serial No. 80,702.

*To all whom it may concern:*

Be it known that I, THEODORE D. CRANE, a citizen of the United States, residing at Little Sioux, in the county of Harrison and State of Iowa, have invented a new and useful Sickle-Head for Mowing-Machines, of which the following is a specification.

This invention relates to sickle heads for mowing machines and its principal object is to provide a sickle head which can be secured to the sickle bar by rivets or like fastenings which are separate from the fastening means employed for securing the sections or teeth of the sickle to the bar, and more particularly to provide for disposing the attachment holding parts of the sections and sickle head each laterally and independently of the other member respectively, so that the rivets or other fastening means for each may be freely accessible. A still further object is to provide a sickle head of the character specified, adapted to avoid obstructing convenient access to the sickle sections, and especially the inner part of the cutting edge, for grinding.

Heretofore considerable inconvenience has been occasioned by the fact that the heads have extended over the sections or teeth and particularly over the attachment holding parts, and it has been necessary to use rivets or the like extending through both the bar and the sections as well as the head for the purpose of securing the parts together. These fastening devices have often become broken or cut thereby releasing the sections. Moreover, the prior constructions have not been adapted for independent renewal of heads and blades, because of the attachment holding parts for each member respectively being superimposed or overlapped by the other member.

One of the objects of the present invention is to so arrange the parts that the sections cannot become disconnected when the connections between the head extension and the sickle bar become broken, nor can the head extension and the bar become loose when the sickle sections are loosened.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred forms of the invention have been shown.

In said drawings:—

Figure 1 is a perspective view showing a portion of the top of a sickle head having the present improvements combined therewith.

Fig. 2 is a transverse section therethrough on the line A—B Fig. 1.

Fig. 3 is a plan view of a portion of the head and one of the sections.

Fig. 4 is a rear elevation of part of the cutter bar near the head.

Fig. 5 is a longitudinal section on the line C—C of Fig. 3.

Referring to the figures by characters of reference 1 designates the end slide of the sickle head, there being an L-shaped tongue 2 extending from this slide or wear plate and constituting the sickle head extension. A rib 3 overlies the plate 1 and preferably terminates in a ball 4 adapted to be engaged by a pitman. It is to be understood, however, that this rib and ball constitute no part of the present invention but can be found on various types of sickle heads already in use. It is to be understood that the sickle head thus comprises a slide part, an extension part or tongue, and a rib and ball part, all joined together rigidly in a mechanically unitary and substantially integral manner, though not necessarily cast, forged, or otherwise formed from a single piece of material.

The tongue or head extension 2 is provided with forwardly extending ears 5 and parallel notches or grooves 10 are preferably formed in the bottom of the tongue at the sides of the ears. These ears are adapted to be riveted or otherwise secured upon a sickle bar 6. The teeth or sections 7 are secured on the sickle bar 6 by means of rivets 8 and have recesses 9 at their inner or back ends adapted to receive the ears 5. Arms 11 are preferably formed at the sides of the recess in each tooth or section 7 and when so provided and extended backward on the teeth are adapted to fit snugly in the grooves 10 so as to be bridged by the tongue 2.

As thus constructed, the sickle head as a whole may be made relatively thin, the knife section 7 and forward part of the head extension 2 being more nearly flush with each other, and access to all of the rivets for the head part 2 and sections 7 being wholly unobstructed. The forward edge of the head extension 2 is substantially scalloped or serrated to interfit with the correspondingly apertured blade 7, and the interlocking ears or arms 5 and 11 being in substantially the same plane, and not lapped one over the other. Ready access may be had to the sections 7 for grinding or otherwise sharpening, by virtue of the free and open clearance at and near the section bases, the head extension 2 being virtually recessed opposite the lateral edges of the blades 7, between the ears 5. The provision of ears or interfitting teeth on the blades and head member adapt the device for disposing all of the rivets therefor substantially in alinement on a comparatively narrow cutter bar.

What is claimed is:—

1. In combination, a long narrow sickle bar having apertures for rivets approximately in alinement, a sickle head having an extension disposed on one end of said bar, a plurality of sickle sections disposed on said bar side by side, adjacent to said extension, said sections and extension having rearward and forward projections respectively formed to interfit and lying on said bar in substantially the same plane, said projections being provided with rivet holes each respectively in alinement with the corresponding apertures in said bar, and rivets set in said apertures for the holes in said sections and extension respectively, whereby said sections are demountable independently of the head extension and said extension is demountable independently of said sections.

2. The combination with a flat sickle bar, of flat cutting sections riveted upon the sickle bar and having their back ends bifurcated each with a rearwardly facing recess and rearwardly projecting arms, a sickle head extension extending over the said rearward arms of the sections disposed back of and freely clearing the section rivets and extending forwardly and downwardly into the cutting section recesses at points in registry therewith, and fastening means extending through said recesses for attaching the extension to the sickle bar independently of said sections.

3. The combination with a flat sickle bar of a series of flat cutting sections disposed side by side thereon, and formed with alternate rearward projections and recesses and an overlying head extension formed with a series of forwardly and downwardly projecting ears spaced according to and occupying the section recesses and bearing upon said bar, and a series of fastenings in the form of rivets disposed in said sections and ears respectively in front of the main body of said extension and securing said sections and extension to said bar.

4. The combination with a flat sickle bar, of flat cutting sections fastened thereon, said sections having openings formed in their back ends, a sickle head extension attached to said bar back of and freely clearing the section fastening means and having projections extending forward and into said openings, and fastening means extending through said openings for attaching the extension to the sickle bar independently of said sections and the section fastening means, whereby the sections are detachable and interchangeable independently of the head extension and its fastening means.

In testimony that I claim the foregoing as my own, I have hereto affixed my signature in the presence of two witnesses.

THEODORE D. CRANE.

Witnesses:
NEWTON J. BRYAN,
HARMON L. PIERCE.

Copies of this patent may be obtained for five cents each, by addressing the "Commissioner of Patents, Washington, D. C."